United States Patent [19]

Holzbach et al.

[11] Patent Number: 5,014,759
[45] Date of Patent: May 14, 1991

[54] VEHICLE WHEEL HAVING VALVE MEANS TO PREVENT MISUSE

[75] Inventors: Wolfgang Holzbach, Garbsen; Carsten Boltze, Wennigsen; Karl-Heinz Kramer, Hanover; Heinrich Meier, Heessen, all of Fed. Rep. of Germany

[73] Assignee: Continental Aktiengesellschaft, Hanover, Fed. Rep. of Germany

[21] Appl. No.: 360,266

[22] Filed: Jun. 2, 1989

[30] Foreign Application Priority Data

Jun. 4, 1988 [DE] Fed. Rep. of Germany ....... 3819048

[51] Int. Cl.$^5$ ...................... B60C 23/06; B60C 29/06; B60C 17/00; F16K 15/20
[52] U.S. Cl. ................................... 152/427; 152/516; 137/456; 137/516.27
[58] Field of Search ............... 152/516, 520, 415, 416, 152/418, 427, 428, 429, 431; 137/224, 456, 516.27, 516.25, 533.11

[56] References Cited

U.S. PATENT DOCUMENTS 3,766,940 10/1973 Mason .......................... 137/533.11

FOREIGN PATENT DOCUMENTS 1030050 4/1978 Canada .............................. 152/516
3000428 7/1981 Fed. Rep. of Germany .
638498 12/1978 U.S.S.R. .............................. 152/415

Primary Examiner—Michael W. Ball
Assistant Examiner—Gregory J. Wilber
Attorney, Agent, or Firm—Robert W. Becker & Associates

[57] ABSTRACT

A vehicle wheel that includes a valve which has a check device, with the wheel being intended for use with a pneumatic tire that even when operating as a tire which is flat or has otherwise lost pressure permits great distances to be covered at a reduced speed. To prevent misuse of the tire, in other words reinflation of a tire subsequent to flat-tire operation and before the tire has been checked for leaks, the valve is provided with a mechanism that prevents such misuse. This mechanism is pneumatically disposed in series with the check device and is installed in an open position and in such a way that it changes over into a closed position upon commencement of a flat-tire operation, with a special tool and/or special replacement parts being required in order to reestablish the open position of the mechanism.

3 Claims, 2 Drawing Sheets

VEHICLE WHEEL HAVING VALVE MEANS TO PREVENT MISUSE

BACKGROUND OF THE INVENTION

The present invention relates to a vehicle wheel that includes a valve which has check means, with the wheel being intended for use with a pneumatic tire that even when operating as a tire which is flat or has otherwise lost pressure permits great distances to be covered at a reduced speed.

A vehicle wheel of this general type is known from German Offenlegungsschrift 30 00 428 Rach et al dated July 9, 1981. Especially due to the good flat-tire operating characteristics of such a vehicle wheel there exists the problem that a driver does not reseal a tire that has possibly developed a leak until he has driven on a flat tire for a long period of time, whereupon the driver reinflates the tire and, without taking into consideration possible damage to the tire due to the long flat-tire operation, fully loads the tire and in particular also resumes the originally permitted high speed. This possibly dangerous reuse of an inflated tire that had previously been operated as a flat tire is designated as "misuse" within the context of the present application. In general, it is irresponsible to reuse a pneumatic vehicle tire that has been operated as a flat tire without first subjecting the tire to thorough tests at a service station that is qualified to check tires.

It is an object of the present invention to provide an arrangement that protects against and prevents misuse of a vehicle wheel and tire arrangement that is capable of flat-tire operation.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
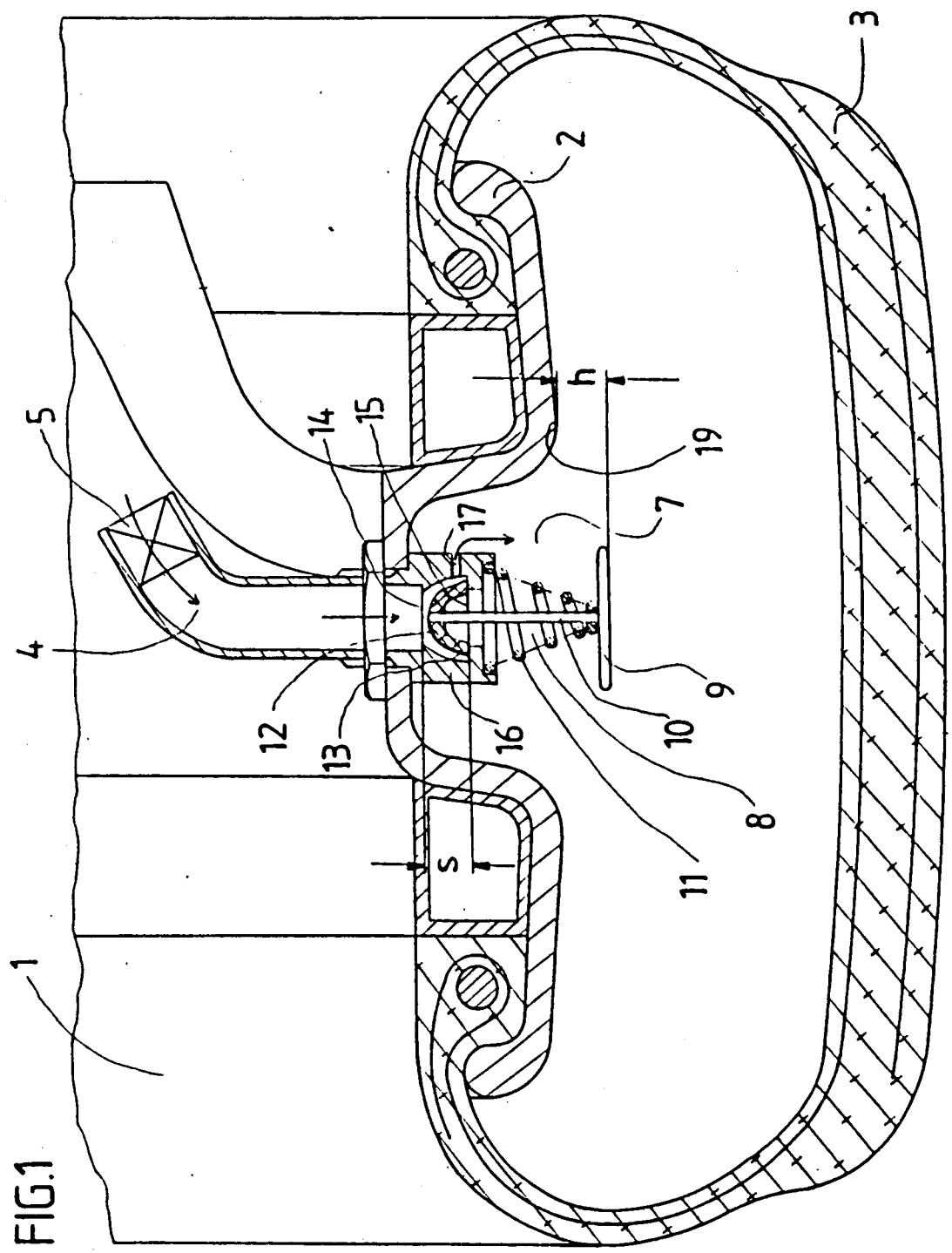
FIG. 1 is a cross-sectional view of part of a vehicle wheel and tire arrangement that is capable of flat-tire operation, with a valve being shown that in the position illustrated permits inflation of the tire.

The vehicle wheel of the present invention is characterized primarily in that the valve thereof is provided with a mechanism that prevents misuse, with this mechanism being pneumatically disposed in series with the check means and being installed in an open position and in such a way that it changes over into a closed position upon commencement of a flat-tire operation, with a special tool and/or special replacement parts being required to reestablish the open position of the mechanism that prevents misuse. As a result of this inventive construction, every driver is forced to find a service station that has the required special parts before a pneumatic vehicle tire that has undergone a flat-tire operation can be reused.

In order to achieve a very high degree of reliability, the mechanism that prevents misuse is preferably embodied in a purely mechanical manner. It is advisable for this mechanism to be provided on its radially outer side with a mechanical sensor that is elevated beyond the radially outer edge of the wheel rim. In the event of a flat-tire operation, the mechanical sensor, due to movement of the tire support surface through the interior of the tire, is pressed radially inwardly by that amount "h" by which the sensor is elevated beyond the radially outer edge of the rim during normal operation. This amount will subsequently be designated as the sensor stroke. In order to prevent an unintended pressing-in of the sensor to as great an extent as possible, for example when the tire is driven over a curb, the sensor stroke is expediently less than 15% of the height of the tire.

Pursuant to one advantageous specific embodiment of the present invention, the mechanism that prevents misuse is provided with a one-way blocking or ratchet mechanism that permits the transition from the open position to the closed position, but blocks the reverse transition. In this way, the signal "flat-tire operation commenced" sensed by the mechanical sensor is mechanically registered. Advantageously, the one-way blocking mechanism is embodied in a form-locking manner and includes a resiliently compressible collar of a sealing sleeve: this collar cooperates with a barb-like stop means in the interior of the valve housing. Due to the fact that the pawl function is taken over by the actual sealing element, a surprisingly low number of individual parts is possible, and hence in addition to an economical price, an extremely high reliability is achieved. In order to ensure a snapping-in of the compressible collar of the sealing sleeve, it is necessary for the mechanical sensor to extend beyond the radially outer edge of the wheel rim by an amount "h" that is greater than or equal to the displacement "s" of the movable blocking mechanism element, namely the compressible sealing sleeve collar, from the open position into the closed position.

In order to prevent criminal deception, for example by merely replacing the entire valve, the support or seating of the valve housing in the interior of the drop center of the wheel rim is expediently secured against a nondetectable detachment by a few drops of a sealing wax that is available only to the manufacturer of the tire.

To assure that responsible action is completely effected, a portion of the one-way blocking mechanism must be destroyed and replaced prior to being able to again inflate the tire. Furthermore, this part that is to be replaced is provided with a code so that each individual part from a particular manufacturing lot can be identified. The sealing sleeve is preferably the aforementioned part of the blocking mechanism, whereby the collar thereof is destroyed for the purpose of removal and exchange. For embodiments having two valve housings, the same effect is achieved in that the two halves are sealed relative to one another, the valve is provided with a code on at least one of the housing halves, and the entire valve must be replaced in order to be able to reinflate the tire.

Further features of the present invention will be described in detail subsequently.

DESCRIPTION OF PREFERRED EMBODIMENTS

Referring now to the drawings in detail, the vehicle tire and tire arrangement 1 illustrated in FIG. 1 includes a wheel rim 2 a tire S, and a valve 4. The valve 4 is essentially divided into a radially inwardly disposed check means 5, and a radially outwardly disposed mechanism 8 for preventing misuse. The mechanism 8 prevents reinflation of the tire 3 after an emergency or flat-tire operation in that, as will be subsequently explained in conjunction with FIG. 2, the supply of air from the radially inwardly disposed check means 5 to the interior 7 of the tire is blocked via the mechanism 8 that is disposed in the radially outer portion of the valve 4. The mechanism 8 for preventing misuse is pneumatically connected in series with the check means 5 that is disposed in the radially inner portion of the valve 4.

The mechanism 8 for preventing misuse comprises a mechanical, plate-like sensor 9, a rod or pin 10, a conically wound spring 11, and a sealing sleeve 12. Depending upon the operating state, the outer collar 13 of the sealing sleeve 12 can find stable support on either of two different step means 14, 15 of the valve housing 16. In FIG. 1, the sealing sleeve 12 is pressed by the spring 11 against the housing step 15. This step 15 need not be smooth since it is not necessary to provide a seal in this position, but rather merely support.

The arrows indicate the direction of flow of air during inflation. The important thing is that in the position illustrated in FIG. 1, the sealing sleeve 12 exposes the bore 17, which extends transversely in the valve housing 16, so that the air can pass through this bore 17 into the interior 7 of the tire.

Figure 2:
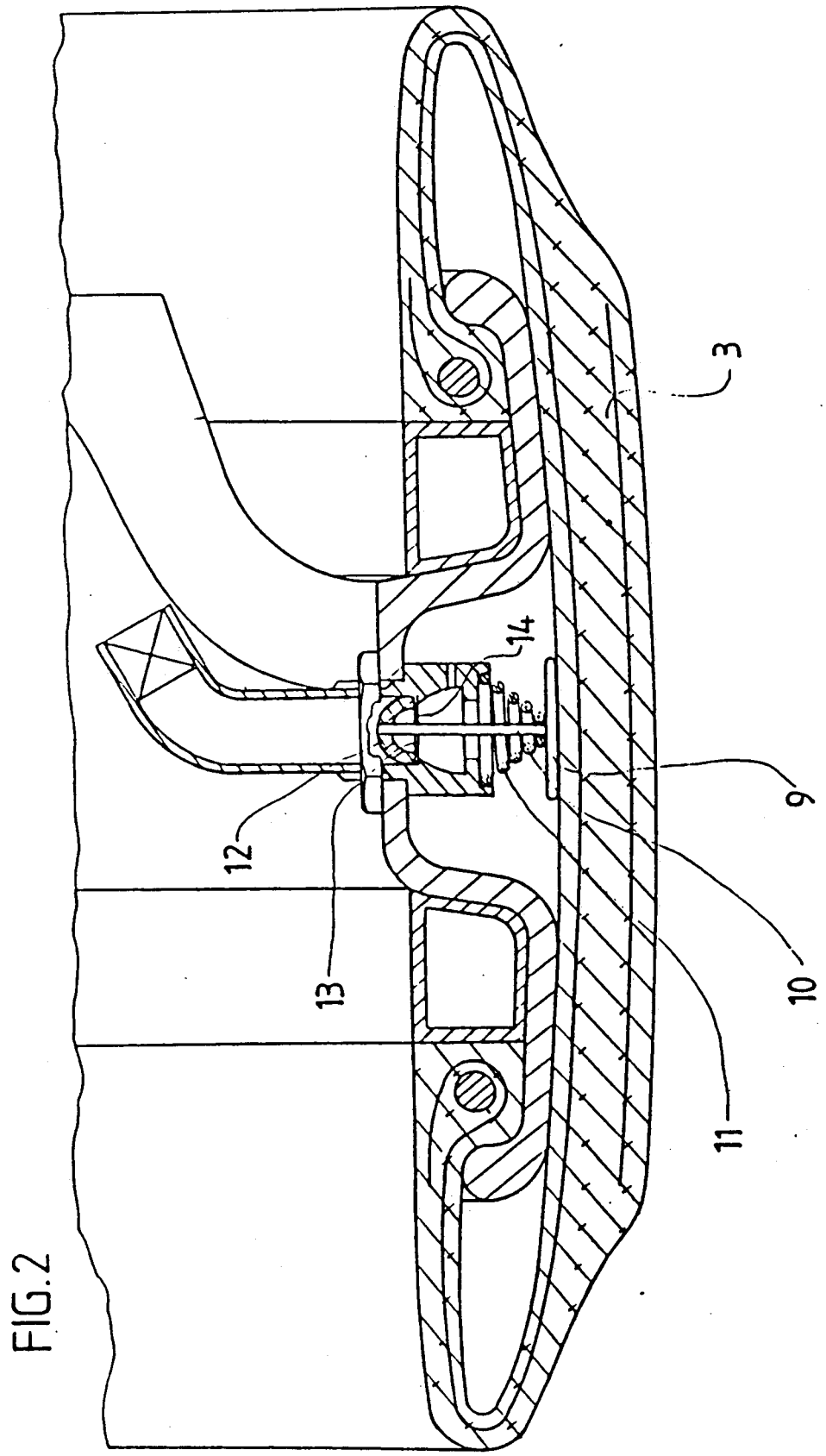
FIG. 2 is a view that shows the vehicle wheel and tire arrangement of FIG. 1, but after commencement of a flat-tire operation, with the valve preventing the interior of the tire from being inflated with air.

FIG. 2 shows the same vehicle wheel and tire arrangement 1, but after a flat tire has occurred. As the support surface of the tire passes or moves through the interior thereof, the flat tire 3 presses the mechanical sensor 9 radially inwardly. This movement is transferred to the sealing sleeve 12 via the pin 10 thereby overpowering the force of the spring 11. Accompanied by resilient compression or deformation of its collar 13, the sealing sleeve 12 passes the barbed housing stop 14 and snaps irreversibly into position behind this stop means 14. The collar 13, which acts to a certain extent as a pawl, seals not only relative to the smooth stop means 14 but also relative to the adjacent wall of the valve housing 16, thus blocking the supply of air into the interior 7 of the tire.

The present invention contributes significantly to the safety of a vehicle wheel and tire arrangement that can operate when the tire is flat. In addition, the present invention discloses a means of precluding abuses.

The present invention is, of course, in no way restricted to the specific disclosure of the specification and drawings, but also encompasses any modifications within the scope of the appended claims.

What we claim is:

1. In a vehicle wheel that includes a valve which has check means, with said wheel being intended for use with a pneumatic tire, that-even when operating as a tire which is flat or has otherwise lost pressure-permits great distances to be covered at a reduced speed, the improvement wherein:

said valve is provided with a mechanism that prevents misuse by closing off a bore for reinflating said tire, with said mechanism being pneumatically disposed in series with said check means, and being installed in an open position and in such a way that said mechanism changes over into a closed position upon commencement of a flat-tire operation, said mechanism that prevents misuse having a radially outwardly disposed end that is provided with a mechanical sensor that in said open position of said mechanism is disposed further radially outwardly than is a radially outwardly disposed edge of a rim of said wheel, said mechanism that prevents misuse including a one-way blocking mechanism that permits a transition from said open position to said closed position, but not from said closed position to said open position; and a valve housing for said valve, with the interior of said valve housing being provided with a barbed stop means; said one-way blocking mechanism being embodied in a form-fitting manner and including a movable part in the form of a sealing sleeve that has a resiliently compressible collar that cooperates with said barbed stop means in said closed position of said mechanism that prevents misuse.

2. A vehicle wheel according to claim 1, in which said mechanical sensor projects beyond said radially outer edge of said wheel rim, in said open position of said mechanism that prevents misuse, by an amount that is at least as great as a displacement that said compressible collar of said sealing sleeve undergoes when moving from said open position of said mechanism that prevents misuse to said closed position thereof.

3. A vehicle wheel according to claim 1, in which said one-way blocking mechanism includes a component that must be removed and replaced prior to reinflation of a tire that has been involved in a flat-tire operation, with this replaceable component being provided with a code that identifies each individual component of a manufacturing lot of such components.

* * * * *